(12) United States Patent
Witkamp et al.

(10) Patent No.: US 7,127,913 B2
(45) Date of Patent: Oct. 31, 2006

(54) CRYSTALLISATION OF MATERIALS FROM AQUEOUS SOLUTIONS

(75) Inventors: Geert-Jan Witkamp, Bergschenhoek (NL); Johannes Pieter Vrijenhoef, Brielle (NL); Johannes de Graauw, Zoetermeer (NL); Frank van der Ham, Edmonton (CA)

(73) Assignees: Technische Universiteit Delft, Delft (NL); Kemira GrowHow Oyj, Helsinki (FI)

( * ) Notice: Subject to any disclaimer, the term of this patent is extended or adjusted under 35 U.S.C. 154(b) by 0 days.

(21) Appl. No.: 10/111,278

(22) PCT Filed: Oct. 20, 2000

(86) PCT No.: PCT/NL00/00768

§ 371 (c)(1),
(2), (4) Date: Sep. 26, 2002

(87) PCT Pub. No.: WO01/28958

PCT Pub. Date: Apr. 26, 2001

(65) Prior Publication Data

US 2004/0060322 A1    Apr. 1, 2004

(30) Foreign Application Priority Data

Oct. 22, 1999    (EP)    .................................. 99203479

(51) Int. Cl.
*B01D 9/04*    (2006.01)
*B01D 35/18*   (2006.01)
*C02F 1/22*    (2006.01)
*C02F 1/00*    (2006.01)
*C01F 11/44*   (2006.01)

(52) U.S. Cl. .......................... 62/532; 62/123; 210/774; 23/304

(58) Field of Classification Search .................. 62/123, 62/532, 542, 66, 67, 68; 210/774, 737; 23/302, 23/303, 304; 48/197 A
See application file for complete search history.

(56) References Cited

U.S. PATENT DOCUMENTS

| | | | | |
|---|---|---|---|---|
| 3,218,188 A | * | 11/1965 | Lippe et al. ................... | 127/43 |
| 3,684,532 A | * | 8/1972 | Gottesman et al. ........... | 62/532 |
| 3,779,030 A | * | 12/1973 | Best ............................. | 62/541 |
| 3,918,916 A | * | 11/1975 | Garrett ........................ | 23/303 |

(Continued)

FOREIGN PATENT DOCUMENTS

GB    0744430 A    *    2/1956

OTHER PUBLICATIONS

Van der Ham, F., Witkamp, G.J., De Graauw, J., Van Rosmalen, G.M. "Eutectic freeze crystallization: Application to process streams and waste water purification." Chemical Engineering and Processing, 37 (Mar. 1998), pp. 207-213.*

(Continued)

*Primary Examiner*—William C. Doerrler
(74) *Attorney, Agent, or Firm*—Fitch, Even, Tabin & Flannery

(57) ABSTRACT

The invention is directed to a process for recovering a crystalline material from an aqueous solution, which solution also contains organic contaminants, in which process the material is crystallised from the aqueous solution by freeze crystallising at a eutectic freezing point of the solution.

19 Claims, 6 Drawing Sheets

U.S. PATENT DOCUMENTS

| | | | | |
|---|---|---|---|---|
| 4,025,573 A | * | 5/1977 | Hathway | 585/805 |
| 4,093,516 A | * | 6/1978 | Lang | 435/165 |
| 4,164,854 A | * | 8/1979 | Martin | 62/536 |
| 4,392,959 A | * | 7/1983 | Coillet | 210/638 |
| 4,504,356 A | * | 3/1985 | Mulder et al. | 162/29 |
| 4,654,064 A | * | 3/1987 | Cheng et al. | 62/532 |
| 5,037,463 A | * | 8/1991 | Engdahl et al. | 62/532 |
| 5,174,859 A | * | 12/1992 | Rittof et al. | 162/29 |
| 5,558,778 A | * | 9/1996 | Janssen et al. | 210/774 |
| 5,814,231 A | * | 9/1998 | Borho et al. | 210/737 |
| 6,159,382 A | * | 12/2000 | Conant et al. | 210/712 |

OTHER PUBLICATIONS

Barduhn, Allen J. "Waste-Water Renovation: Part 1. A Design Study of Freezing and Gas Hydrate Formation." U.S. Dept. of Health, Education, and Welfare. Public Health Service Publication No. 999-WP-4. Oct. 1963.*

Stepakoff, G. L. et al. "Developement of a Eutectic Freezing Process for Brine Disposal." Desalination 14 (1974) 25-38.*

Barduhn, Allen J. and Manudhane, Avinash. "Temperatures Required for Eutectic Freezing of Natural Waters." Desalination 28 (1979) 233-241.* van der Ham, F. et al. "Eutectic freeze crystallization simultaneous formation and separation of two solid phases." Journal of Crystal Growth 198/199 (1999) 744-748.*

\* cited by examiner

CRYSTALLISATION OF MATERIALS FROM AQUEOUS SOLUTIONS

CROSS-REFERENCED APPLICATIONS

This application is a national phase of International Application PCT/NL00/00768, filed Oct. 22, 2000, which designated the U.S. and that International Application was not published under PCT Article 21(2) in English.

The invention is directed to the crystallisation of materials, especially salts, acids or bases, from aqueous solutions further containing organic contaminants.

In various processes, streams of different nature are present that contain valuable components, however, quite often in combination with organic contaminants. It is often very difficult to recover these valuable components, such as salts, or acids, or bases in an economically attractive manner.

These streams usually contain organic or inorganic salts and/or acids and/or alkaline compounds, in combination with organic contaminants (and optionally other, non-crystallizing materials). Examples of materials to be crystallized are numerous, the acids being for example nitric acid and phosphoric acid; the alkaline materials may be hydroxides, such as potassium or sodium; and the salts can be nitrates, phosphates, oxalates, sulphates, chlorides of various cations, including, but not limited to ammonium, and alkali metal or alkaline earth metals, such as potassium, magnesium, sodium and calcium.

Examples are waste streams such as the by-products obtained in acid (or base) catalysed chemical reactions, the waste stream obtained from processing of agricultural products (fermentation, sugar production, cheese production), the scrubbing of exhaust air from cattle growing, a liquid phase derived from manure processing and the like.

Aqueous agricultural waste streams suitable for use in the present process include molasses, vinasse and potato chick juice. These streams can be subjected to the process of the present invention directly, or after further treatment, such as clarification, neutralisation, ion exchange and the like.

In the recovery of starch from potatoes, an acidic waste stream containing a substantial amount of potassium and nitric or phosphoric acid is produced. In order to recover the potassium from it, conventionally the material is subjected to ion exchange, followed by evaporative crystallisation, optionally after neutralisation of the acid, for example with potassium hydroxide. However, this process only results in a recovery of the potassium nitrate of about 90% and/or is considered costly in view of additional neutralisation costs.

Agricultural by-products, for example molasses, can be used for industrial fermentation processes. After the valuable product, bakers yeast, ethanol, citric acid, and the like, have been extracted from fermentation broth, a liquid with an increased level of potassium is obtained. This liquid is often concentrated (vinasse).

In addition to the potassium, the liquid agricultural and fermentation by-products contain valuable organic materials, that can be used in cattle feed. However, increased potassium levels are not desirable, and decrease the value of the products.

The recovery of the materials from these waste streams is quite often too laborious or complicated to be economically attractive.

In the process industry often process streams are present, containing valuable components, such as acids, bases or salts, in combination with organic material. These process streams have to be processed to recover one or more of these valuable materials, either the acid/base/salt, or the organic material. Quite often this requires laborious, complicated and/or costly process steps.

Especially the presence of the organic material (organic contaminants) makes it difficult to obtain the valuable materials (acid/base/salt) in sufficiently pure form, or to remove the salt/acid/base in sufficient amounts from the organic material.

In the present application the term organic contaminant(s) is used to indicate organic material that should not be present in the crystalline material, as it decreases the value thereof. Of course it is quite possible that the organic material as such is also a valuable component, for example constituting the main product. The organic material may be of natural or synthetic origin, examples being proteins, sugars, amino acids, polyols and the like.

Conventional methods for removing valuable materials from aqueous systems include evaporative crystallisation, cooling crystallisation, reverse osmosis, extractive crystallisation, ion exchange and the like. All these methods suffer prom one or more drawbacks, when applied to the crystallisation of materials, especially salts or acids, from aqueous solutions further containing organic contaminants.

Evaporative crystallisation is a method that is quite common for the recovery of these materials, however, it is difficult to obtain high yields and/or pure product. With acidic streams corrosion problems may occur, and due to the high temperature required for high yields, the organic material may decompose, resulting in other types of contamination, that is sometimes difficult to remove. This may also result in contamination of the gas phase, so that the recovered water is no longer pure.

Cooling crystallisation has the disadvantage of limited yield.

Reverse osmosis usually does not produce materials of sufficient purity and/or sufficiently high concentration, thus requiring further purification steps, such as crystallisation; additionally it is rather limited in application due to the sensitivity to contamination, it has short operational periods and is rather expensive in use. The concentration of the valuable materials generally remains low due to the high pressures required, which makes suitable crystallisation rather difficult. The nature of reverse osmosis equipment makes it difficult anyway to produce crystalline material directly, as the supersaturation is created near the membrane surface (scaling).

Ion exchange suffers from the drawback of low concentrations, with the consequence that crystallisation is difficult. Also this technique is inherently less suitable for crystallisation.

Accordingly there exists a need for a process for the recovery of valuable materials from process streams that does not have the disadvantages described above. Further, it would be interesting if the water would be recoverable too, optionally in combination with a concentrated stream of the organic material, freed from the other component(s).

In general the present invention has as one of its objects to reduce the environmental burden, by decreasing the volume of waste streams and/or by reducing the energy requirements for the separation/purification techniques.

The invention is based on the use of eutectic freeze crystallisation, which is a process based on separation of components at a eutectic freezing point. Eutectic freeze crystallisation has been described in Chem.Eng-Proc. 37, (1998), pp 207–213, the contents of which is incorporated herein by way of reference.

The present invention concerns a process for recovering a crystalline material from an aqueous solution, which solution also contains organic contaminants, in which process the material is crystallised from the aqueous solution by freeze crystallising at a eutectic freezing point of the solution.

It has been found, that using eutectic freeze crystallisation for obtaining crystalline materials from process streams containing organic contaminants, results in a very efficient and economic process. With this process it is possible to obtain a high purity and a high yield of crystalline salt, without the need to have either very complicated or large equipment, or to use large amounts of energy. Further, pure ice crystals are obtained that can be processed easily to pure water, suitable for technical purposes. Finally a stream of organic material is obtained, that is strongly reduced in volume compared to the original volume of the stream, which stream of organic material does contain only relatively low amounts of the said valuable material. This stream may be useful for other purposes, such as cattle feed or for re-circulation into an upstream process.

The present invention provides the surprising finding that with a relatively easy process, an aqueous process stream containing crystallisable material and organic contaminants, as defined herein, can be processed into pure water, pure crystals and a small stream containing organic material. In short, the original stream can be processed into at least two valuable components, water and crystals of the material, in case of the application to waste streams, thereby strongly decreasing the environmental burden.

The process of the present invention is generally applicable to all aqueous process streams that contain crystallisable material in addition to organic contaminants. More in particular it is applicable to situations where the crystalline material is the valuable component, but it is also possible that the process is used to extract materials in crystalline form from the organic material. In the end may also be envisaged, but certainly less preferred, that water is the most valuable component.

In general the process of the present invention is applicable to the crystallization of materials of various nature, such as salts and acids, or alkaline materials, of organic and inorganic nature, the only restrictions being that they are water-soluble and exist in crystalline form. Examples of the materials for which the process of the present invention is applicable have been given in the introduction. It is to be noted that in case of acidic or alkaline materials, it is not always necessary to neutralise them. Quite often these acidic or alkaline materials can be recovered as such, either as crystals or as a purge stream. These materials can then be re-used, for example in upstream process equipment, or they can of course have their own material value.

Examples of waste materials are i.a. the liquid residues from various treatments of agricultural products, including fermentation and extraction methods, cheese production (whey, cheese brine), the waste streams of acid catalysed chemical reactions, the scrubbing liquid of off-gases of cattle sheds, or liquid residues from manure treatment processes by electrolysis (optionally combined with peroxide treatment) or biogasification in combination with ultra-filtration.

These waste products all have in common that they contain amounts of valuable crystallisable materials and organic contaminants. In some cases the salt is the result of a neutralizing treatment, such as with the waste streams of acid catalysed reactions. Before or after recovery of the product form the reaction mixture the acid used therein is neutralised with a suitable alkali, often sodium- or potassium-hydroxide or -carbonates.

The process of the present invention is also very suitable for the recovery of potassium nitrate or phosphate from acidic waste streams, such as from the potato thick juice. As has been described in WO-A 9747559, liquid agricultural by-products are subjected to clarification, ion exchange, neutralisation concentration and crystallisation. When the process of the present invention is used in conjunction herewith, it becomes possible to reduce the investment and operational costs substantially, while at the same time improving yield and purity of the products Further, by careful selection of the operational points one can dispense with the neutralisation and re-circulate a purge stream with organic material to the upstream ion-exchange, as acid source for eluting the potassium. In a preferred embodiment the eluens from the ion-exchange is pre-concentrated in an evaporative crystallisation unit.

In freeze crystallisation at a eutectic freezing point (Eutectic freeze crystallisation; EFC) on the one hand crystalline material is obtained, and on the other hand ice crystals. Because of the very high selectivity of salt and ice crystallisation, organic material will remain in the liquor and will build up in a recycle stream. The level of organic materials and optional other components can be easily controlled by adjusting a purge stream, if necessary, In some cases this purge stream can advantageously be recirculated to upstream process equipment, for example as neutralising agent or as eluting agent.

As has been described in the cited reference, EFC is based on the principle that a solution of a salt in water exhibits a eutectic freezing point. In the phase diagram water-salt, it can be seen that in case an unsaturated water salt mixture is cooled down to the freezing point thereof, ice crystals form first. This increases the salt concentration in the solution and decreases the temperature along the freezing point depression line, until the solution is saturated. At this composition the eutectic freezing point is reached. Further heat withdrawal results in simultaneous formation of both ice crystals and crystals of salt. In case the solution becomes (or is) saturated, first the salt will crystallise and the temperature will decrease along the solubility line, until a eutectic freezing point is reached. Then simultaneous formation of both ice crystals and crystals of salt occurs again at or near the eutectic point. In continuous operation, the operation point will therefor lie close to the eutectic point, irrespective of the feed composition.

Due to the difference in density and/or particle size, the crystals of salt and the ice can be recovered separately.

In the process of the invention it is possible to have only one material that crystallises. However, it is also possible to have two or more materials. In such a situation one may encounter the presence of more than one eutectic freezing point.

The process can be carried out at atmospheric pressure, or decreased or increased pressure. Generally atmospheric pressure is preferred, in view of ease of construction. It may, however, be advantageous to use increased pressure, for example in case use is made of the phenomenon of gas-hydrates (Clathrates). When operating at higher pressures, up to, for instance 75 bar, in the presence of a gas (such as $CO_2$), gas-hydrates crystallise, with the same effect on the liquid system, at relatively high temperatures, thereby decreasing the cooling requirements, and sometimes allowing salts to be crystallized containing less crystal water.

The cooling for the freeze crystallisation is done by conventional equipment, using the most economic energy source available at the location where the equipment is. This may be electricity or a turbine driven cooling system, or other sources of cold, for instance on-site available liquid nitrogen, ammonia or $CO_2$.

EFC has been found to be very suitable for recovering valuable materials from aqueous solutions, also containing organic contaminants. More in particular it is useful for systems, wherein high concentrations of one type of ion or salt are present, in combination with organic material According to a preferred embodiment, the EFC step is preceded by an upstream preconcentration step, such as reverse osmosis, evaporative crystallisation and/or ultra-filtration.

EPC can suitably be performed using well known crystallisation units, such as a forced circulation crystalliser, a draft tube baffled crystaliser, a GMF™ cooled disk crystalliser or a cooling disk crystalliser (CDCC), such as depicted in FIGS. 1A, 1B-1, 1B-2 and 1C.

BRIEF DESCRIPTION OF THE DRAWINGS

FIG. 1B1 is an external view of the crystallizer.
FIG. 1B2 is a cut-away of the crystallizer.
FIG. 2 is a view of the entire system of the present invention.

FIGS. 1A, 1B-1 and $1^{b2}$ 1B-2 show schematic representations of the CDCC. Cooling is provided by means of disks which are wiped to prevent scaling and to improve heat transfer. The advantage of this type of design is its scale-up potential: the area available for cooling scales up a 1:1 ratio with increasing volume of the crystalliser (provided the distance between cooling disks is kept equal). The feed stream(s) enters the crystallizer at the centre of the column. Inside the column, ice and salt crystals form and, due to their density difference with the liquid, respectively move up to the top and down to the bottom of the column. Liquid as well as solids can move freely through the column because the cooling disks have orifices enabling the transport.

In FIG. 2 a schematic set up is given of a pilot plant for carrying out the process of the present invention schematically shows the pilot plant set-up. At the centre, the CDCC crystalliser resides. The crystalliser is fed from a 100 litre storage vessel (STORE). A peristaltic pump FEEDPUMP pumps the feed to a pre-cooling heat exchanger HTXR. The heat exchanger is cooled by a thermostatic unit PRECOOL Lauda RK8-KP. For the CDCC, the cooling fluid flowing inside the cooling disks is methanol. The methanol is cooled by thermostatic unit COOL. The bottom flow is pumped by BOTPUMP to the product vessel (PROD) by a peristaltic pump. The top flow automatically flows to the PROD vessel.

Ice crystals are analysed as follows: an isolated, glass column is mounted below the CDCC, ICESAMPLER. The ice outlet from the CDCC is connected to the feed of the column and by force of gravity, the slurry flows from CDCC to the column. At the centre of the column, liquid is removed by means of a pump. The ice crystals float to the top of the column. In this way, a bed of ice crystals is formed. About 300 ml of the ice bed is scooped into an isolated flask and transported to an isothermal 'cold room' set at 273 K. All filtration equipment is situated inside this room. The ice crystals are filtered on a glass filter using a vacuum pump.

The vacuum pump is switched off and the crystals are suspended (washed) with distilled water at 273 K. The pump is turned back on and the crystals are again filtered. This procedure of filtration and washing is repeated several times. Salt crystals are obtained by filtration of the bottom outlet flow of the CDCC. A microscope is also present inside the cold room. Ice crystals collected directly from the top of the column are transported to the cold room where microscope pictures are taken.

Liquid composition of top and bottom outlets are determined by density measurements. The density of a sample is measured with a pyknometer.

Flow rates and crystal mass concentrations are measured as follows: the top flow is collected for a period of time in an insulated flask. The flask is weighed to give the total mass flow. The slurry inside the flask is filtered and the filtrate is weighed. The amount of filtrate in combination with the total amount collected results in a mass fraction of ice in the slurry. This procedure is repeated for the bottom flow.

A coloured $KNO_3$ solution was obtained from ion exchange, and contained approximately 15 w % $KNO_3$, 1 w % $HNO_3$ and organic impurities resulting from the upstream processing. In industrial practice this solution would be the feed stream directly. Here this solution was pretreated, and by cooling and addition of pure $HNO_3$ a feed stock of around the eutectic composition was obtained. This solution was fed according to the setup of FIG. 2 to the crystalliser, where ice and $KNO_3$ were formed simulaneously. The $KNO_3$ obtained was a well filterable white powder, with particles sizes of about 100 μm. The ice was washed various times with water of around 0° C. The ice was melted, and analysed by ICP-AES for K.

Figure 3:
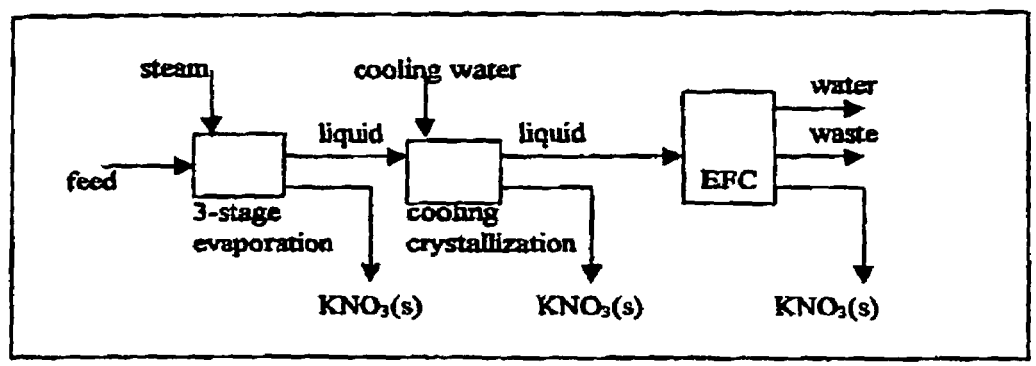
FIG. 3 is a schematic representation of the present process.

In FIG. 3, a flow sheet is given of a preferred embodiment, wherein a combined process is described using evaporative crystallisation as pre-concentration, followed by eutectic freeze crystallisation The evaporative crystallisation-eutectic freeze concentration (EVAP-EFC) process combines both evaporative crystallisation with cooling and the EFC process. The hot, saturated liquid stream exiting the evaporation unit is fed to a crystallizer that is cooled by cooling water The solid crystals that form during the cooling process are removed and the cooled liquid is transferred to the EFC unit.

The process is designed in such a way that the water removal is primarily done in the evaporation unit and the crystallization in the EFC unit. This is possible, when the volubility of the material is high at high temperatures and low at low temperatures. The total yield of the process is determined by the conditions of the EFC process, because the EVAP and EFC unit are operated in a serial way i.e. all liquid exiting the evaporative/cooling stage enters the EFC process.

The process described in this FIG. 3 is applied to the eluens from the ion-exchange described in WO-A 9747559.

In this particular case the thermodynamic conditions are very favourable for EFC: $HNO_3$ (up to a certain concentration) has the advantage that it decreases the $KNO_3$ solubility, thereby increasing the yield even at not too low working temperature. Depending on the flow ratio of the feed and the recycle streams the conversion and the eutectic point are established. For a theoretical yield of 99%, while still maintaining a not too low eutectic temperature, the conditions in the crystalliser are: $[KNO_3]$=5.6 w %, $[HNO_3]$=9.3 w % at a temperature of −8.5 C. This is also approximately the composition of the purge and recycle streams.

Figure 4:
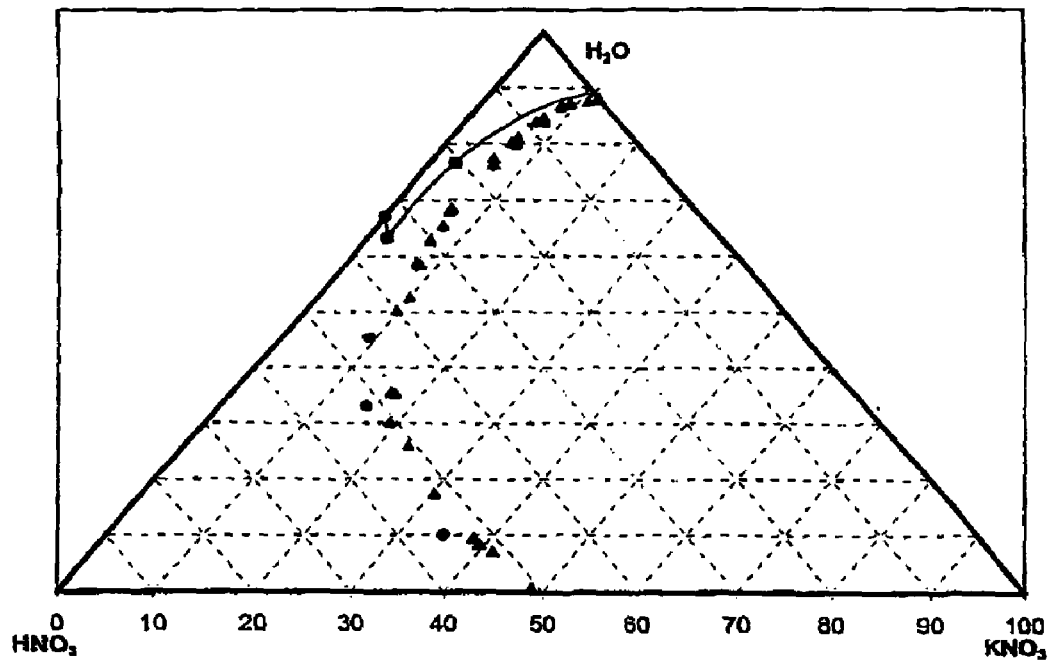
FIG. 4 is a phase diagram of the components of the system.
Figure 4:
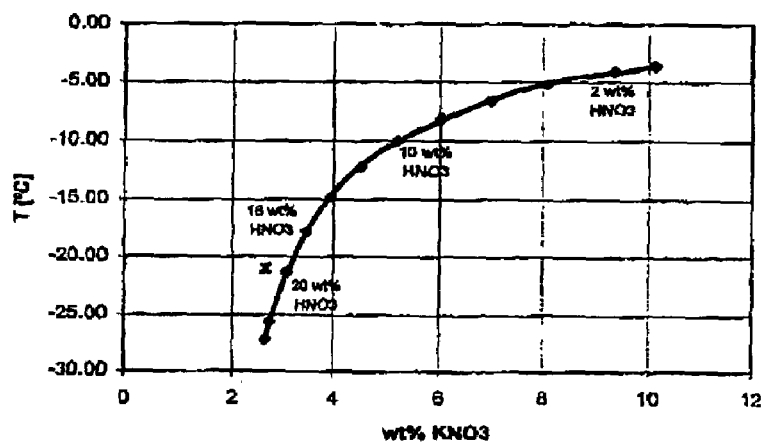

FIG. 4 gives a graph of the ternary phase diagram for the system $KNO_3$, $HNO_3$, $H_2O$, as well as the eutectic conditions for this system at various concentrations of $HNO_3$.

Evaporative Crystallisation

At 40% yield, the (remaining) amount of KNOX in the liquid is set and from the solubility line at 60° C., the properties of the liquid exiting the evaporation unit can be determined.

Specifications for the 3.5 Multi-Effect Evaporation Unit in the EVAP-EFC Process

| | |
|---|---|
| amount of solid $KNO_3$ formed | 0.37 kg/s |
| amount of water evaporated | 4.14 kg/s |
| average heat of evaporation $DH_{evap}$ | 2300 kJ/kg |
| heat transfer rate | 9522 kW |
| net number of effects | 3.5 — |
| feed steam usage | 1.18 kg/s |
| heat transfer flux coefficient | 12 kW/m² |
| evaporation surface needed | 794 m² |

Cooling Crystallization

The hot liquid exiting the evaporation unit is cooled with cooling water in a crystallizer similar to the EFC crystallizer. The temperature inside the crystallizer is set at 30° C.

Properties for the Cooling Crystallization Unit

| | |
|---|---|
| feed liquid (kg/s) | 1.25 |
| $KNO_3$ formed (kg/s) | 0.37 |
| cooling range (° C.) | 60 → 30 |
| Cooling required in crystallizer | |
| cooling feed (kW) | 88 |
| formation of salt (kW) | 117 |
| totat (kW) | 205 |
| heat flux coefficient (kW/m⁻²) | 2 |
| cooling area needed (m²) | 103 |

Eutectic Freeze Crystallization

The cooled liquid from the cooling crystallization unit is cooled to the eutectic point in the eutectic freeze crystallization unit.

Properties of the Eutectic Freeze Crystallization Unit

| | |
|---|---|
| feed liquid (kg/s) | 0.92 |
| $KNO_3$ formed (kg/s) | 0.21 |
| cooling range (° C.) | 30 → −10 |
| Cooling required in crystallizer | |
| cooling feed (kW) | 100 |
| formation of ice (kW) | 36 |
| formation of salt (kW) | 75 |
| total (kW) | 212 |
| heat flux coefficient (kW/m⁻²) | 2 |
| cooling area needed (m²) | 106 |

The Cooling Machine

The cooling machine needed in the EFC section has a COP=3.63 and therefore requires 212/3.63=58 $kW_{elec}$ electricity.

Figure 1A:
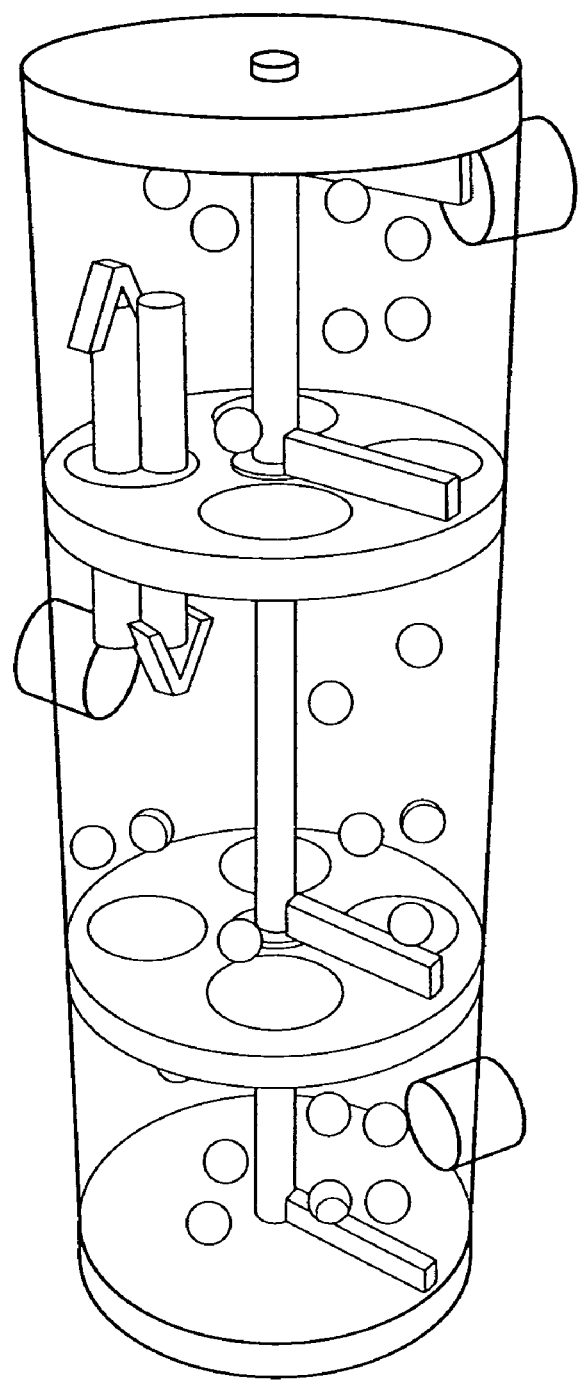
FIG. 1A is an internal view of the cooled disk crystallizer.
Figures 1, 1B, 2:
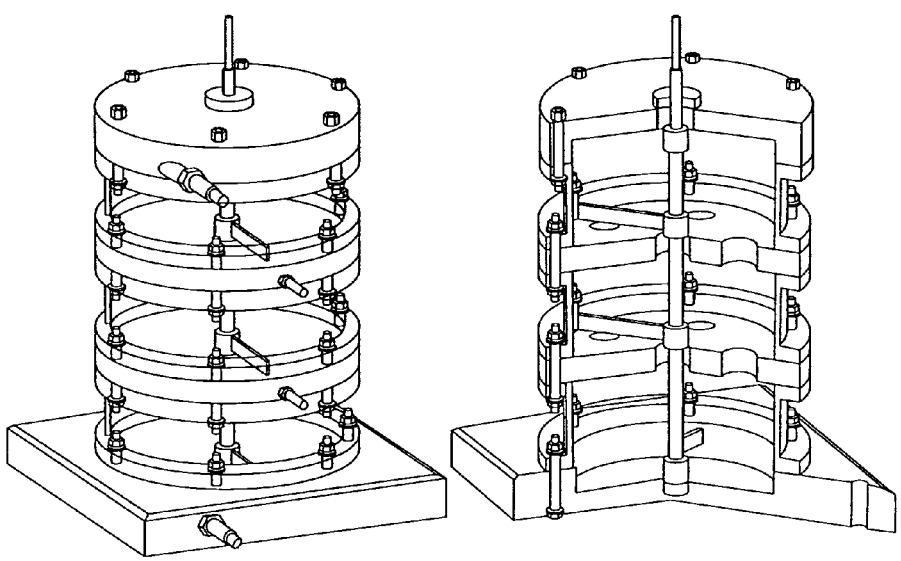
Figure 1C:
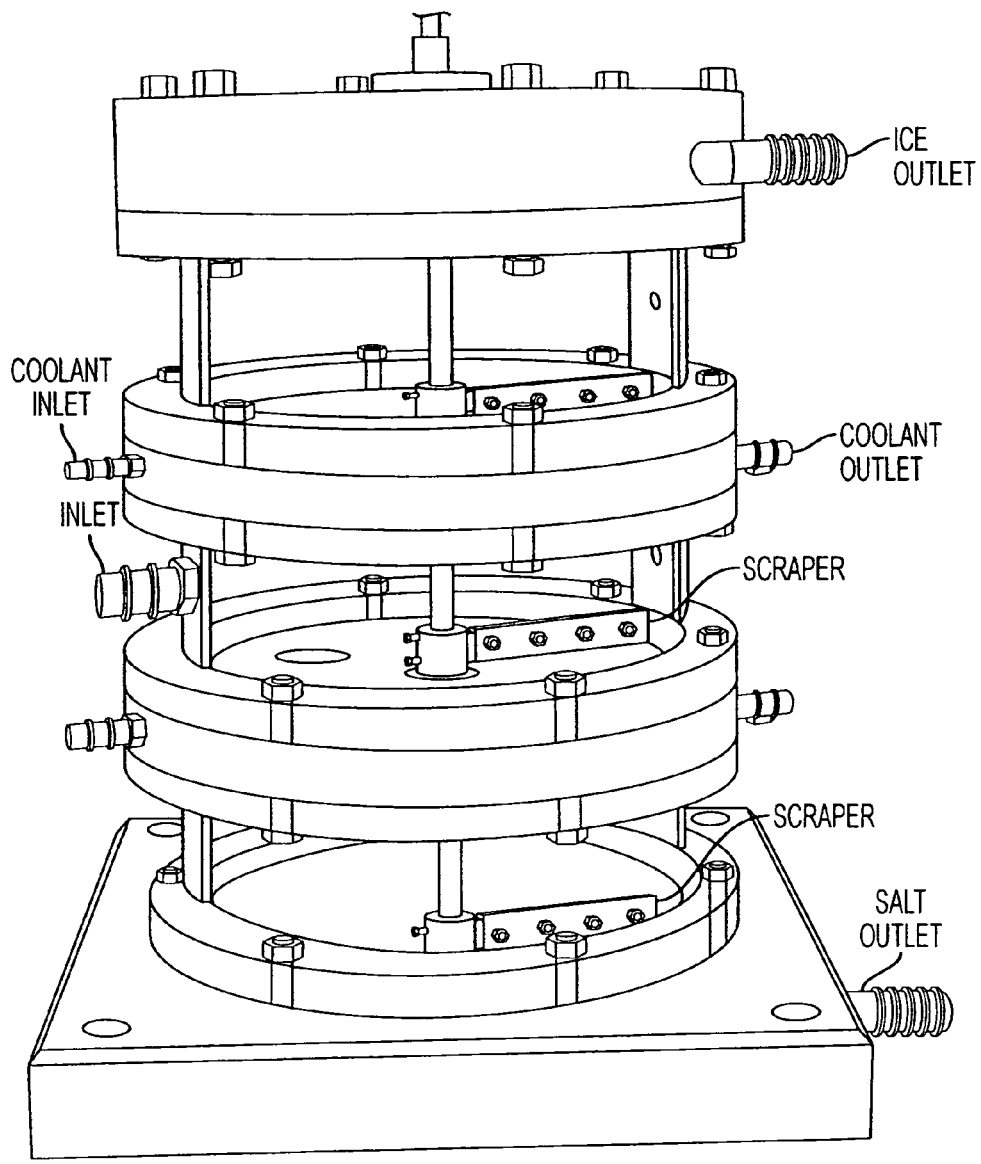
FIG. 1C shows the crystalliser, with transparent mantle.
Figure 2:
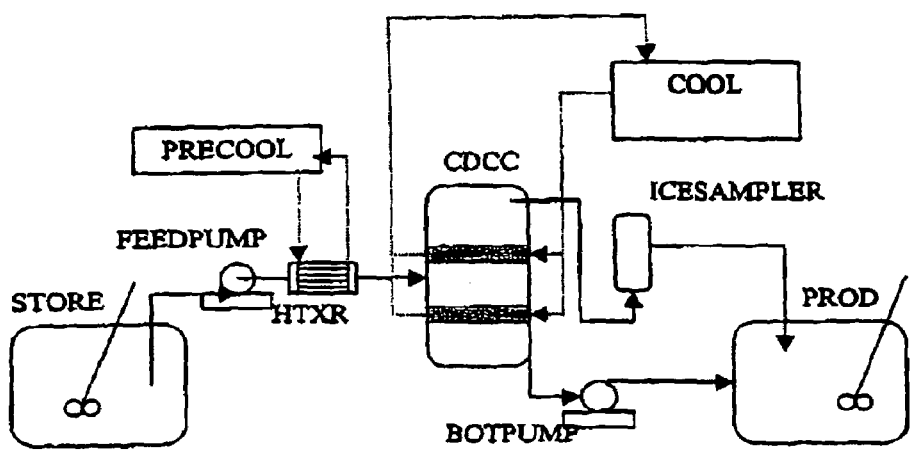

Based on the process described in relation to FIG. 2, two experiments were carried out:

Experiment 1.

Residence time of the solution is 2 hours.

After 4 hours of operation in eutectic conditions, ice has been collected.

This ice has been washed several times and analyzed:

| | |
|---|---|
| 3 wash steps | 8.88 ppm KNO3 |
| 5 wash steps | 1.52 ppm KNO3 |

Experiment 2

Residence time of the solution is 2 hours.

After 5 hours of operation in eutectic conditions, ice has been collected.

This ice has been washed several times and analyzed:

| | |
|---|---|
| 3 wash steps | 4.71 ppm KNO3 |
| 5 wash steps | 0.41 ppm KNO3 |

The invention claimed is:

1. A process for producing a crystalline material of high purity from a aqueous solution, wherein said aqueous solution also contains organic contaminants, said process comprising crystallizing material from the aqueous solution by freeze crystallizing at a eutectic freezing point of the aqueous solution, thereby generating a separate flow of ice crystals, a flow of said crystalline material and a flow containing said organic contaminants in a higher concentration than in said aqueous solution; recovering the crystalline material of high purity for further use; and recovering organic contaminants separate from said flow of the crystalline material for further use.

2. The process according to claim 1, wherein the aqueous solution has been pre-concentrated in an upstream concentration step.

3. The process according to claim 2, wherein the upstream concentration step comprises at least one of reverse osmosis, evaporative concentration or ultra-filtration.

4. The process according to claim 3, wherein the upstream concentration step comprises evaporative concentration, said evaporative concentration including partial crystallization of a salt as a crystalline material.

5. The process according to claim 1, wherein said crystalline material comprises a salt selected from the group of sodium, potassium, magnesium and ammonia salts.

6. The process according to claim 5, wherein the said salt is selected from the group of nitrates, phosphates, suiphates and organic salts.

7. The process according to claim 6, wherein the said salt is selected from the group of potassium nitrate, magnesium nitrate, mono potassium phosphate, di potassium phosphate, ammonium sulphate, ammonium phosphate, ammonium nitrate, sodium phosphate and sodium nitrate.

8. The process according to claim 1, 2 or 3, wherein the aqueous solution is a liquid agricultural or fermentation by-product or a derivative thereof.

9. The process according to claim 1, 2 or 3, wherein the aqueous solution is a waste stream from an acid catalysis chemical process.

10. The process according to claim 1, 2 or 3, wherein the aqueous solution is derived from scrubbing off-gases from an agricultural shed for keeping cattle.

11. The process according to claim 1, 2 or 3, wherein the aqueous solution is obtained from processing cattle manure.

12. The process according to claim 1, wherein, during the freeze crystallization, ice and the crystalline material are produced, and said process comprises separating the ice and crystalline material by at least one of a difference in density or particle size.

13. The process according to claim 12, wherein the crystalline material comprises a salt and the salt is selected from the group consisting of potassium, magnesium and ammonia salts.

14. The process according to claim 13, wherein the process further comprises pre-concentrating the aqueous solution before crystallizing the material by the freeze crystallizing.

15. The process according to claim 1, wherein, during the freeze crystallization, ice and the crystalline material are produced, and said process comprises separating the ice and crystalline material by difference in density.

16. The process according to claim 1, wherein, during the freeze crystallization, ice and the crystalline material are produced, and said process comprises separating the ice and crystalline material by particle size.

17. The process according to claim 1, wherein the process is carried out at atmospheric pressure.

18. The process according to claim 1, wherein the process is carried out at about atmospheric pressure up to 75 bars.

19. A process for producing a crystalline material of high purity from a aqueous solution, wherein said aqueous solution also contains organic material, said process comprising crystallizing material from the aqueous solution by freeze crystallizing at a eutectic freezing point of the aqueous solution, thereby generating a separate flow of ice crystals, a flow of said crystalline material and a flow containing said organic material in a higher concentration than in said aqueous solution; recovering the crystalline material of high purity; recovering said organic material separate from said flow of the crystalline material; and using said recovered organic material in the production of a cattle feed.

* * * * *